United States Patent
Amber

(10) Patent No.: US 9,237,807 B1
(45) Date of Patent: Jan. 19, 2016

(54) FURNITURE SLIDE ASSEMBLY

(71) Applicant: John L. Amber, Delray Beach, FL (US)

(72) Inventor: John L. Amber, Delray Beach, FL (US)

( * ) Notice: Subject to any disclaimer, the term of this patent is extended or adjusted under 35 U.S.C. 154(b) by 0 days.

(21) Appl. No.: 14/531,265

(22) Filed: Nov. 3, 2014

(51) Int. Cl.
*A47B 91/06* (2006.01)
*F16B 2/06* (2006.01)

(52) U.S. Cl.
CPC . *A47B 91/06* (2013.01); *F16B 2/06* (2013.01); *Y10T 16/191* (2015.01); *Y10T 16/209* (2015.01)

(58) Field of Classification Search
CPC . Y10T 16/191; Y10T 16/1937; Y10T 16/209; Y10T 16/21; A47B 91/06; A47B 91/12; A47C 7/002; F16B 2/06
USPC ...... 16/30, 33, 42 R, 42 T; 248/188.9, 346.11
See application file for complete search history.

(56) References Cited

U.S. PATENT DOCUMENTS

| | | | |
|---|---|---|---|
| 766,210 A * | 8/1904 | Young, Jr. | 16/42 R |
| 779,402 A | 7/1905 | Abrams | |
| 887,663 A * | 5/1908 | Lee | 248/188.9 |
| 909,827 A * | 1/1909 | Seibert | 135/84 |
| 1,066,381 A | 7/1913 | Daniel | |
| 1,563,700 A * | 12/1925 | Frankenstein | 182/111 |
| 2,107,629 A * | 2/1938 | Dallas | 248/188.2 |
| 2,890,824 A | 6/1959 | Derby et al. | |
| 2,935,813 A | 5/1960 | Berman et al. | |
| 3,191,212 A * | 6/1965 | Hahn et al. | 16/42 R |
| 4,117,999 A | 10/1978 | Gessler | |
| 4,138,763 A | 2/1979 | Cooley | |
| 5,069,102 A * | 12/1991 | Wolf | 84/280 |
| 5,727,284 A * | 3/1998 | Deutsch | 16/30 |
| 5,983,452 A * | 11/1999 | McGovern | 16/42 R |
| 7,124,986 B1 * | 10/2006 | Bailey | 248/188.9 |
| 7,162,772 B2 | 1/2007 | Asher | |
| 7,757,346 B2 * | 7/2010 | Chase | 16/42 R |
| 8,726,463 B2 | 5/2014 | Bushey et al. | |
| 2008/0244870 A1 * | 10/2008 | Chase | 16/42 R |

\* cited by examiner

*Primary Examiner* — William Miller
(74) *Attorney, Agent, or Firm* — Glenn E. Gold; Gold & Rizvi, P.A.

(57) ABSTRACT

A furniture slide assembly includes a slide body with a top for supporting the furniture leg and also has a bottom surface with a substantially low coefficient of friction. A clamp assembly is affixed to and supported above the slide body assembly and includes a clamp body formed of a resilient material. The body has a first arm and an opposing second arm wherein the body, the first arm, and the second arm have an inner surface which defines a receiving aperture in the clamp body. The first arm and the second arm further define an opening therebetween. A clamp arm extends from a distal end of the first arm and is securable to the second arm.

20 Claims, 6 Drawing Sheets

US 9,237,807 B1

FURNITURE SLIDE ASSEMBLY

FIELD OF THE INVENTION

The present disclosure generally relates to apparatuses and methods for moving furniture. More particularly, the present disclosure relates to a furniture slider attachable to a leg of the furniture to reduce the friction of sliding the furniture across the surface of a floor.

BACKGROUND OF THE INVENTION

The vast majority of people have their own unique space which they call home. Home may be a house which they own or rent, a condominium or an apartment. The interior of one's home contains many objects such as wall decorations and furniture to make the home comfortable and personalized to an individual's taste. In the course of living in the home over a period of time, most individuals also prefer some variety to keep the interior from becoming boring. While wall decorations such as pictures and knickknacks can readily be interchanged with other similar objects, the basic items of furniture did not have that flexibility. Furniture objects such as sofas, upholstered chairs, tables, and the like cannot be readily exchanged for other pieces of furniture due to cost and size limitations. However, the articles of furniture, as a result of being freestanding within a room, do lend themselves to be rearranged to present a degree of variety.

When rearranging or moving furniture, often more than one individual are required to accomplish the task because of the bulk and the weight of the articles of furniture. Consequently, some individuals may install casters on the legs to facilitate moving the furniture articles without needing to draft the services of another individual. However, casters are typically permanently affixed to the legs of the furniture and if resting on a hard surface will tend to move as a result of daily use requiring constant adjustment of the furniture placement. Alternatively, if the article of furniture rests upon a carpeted floor, the casters may not readily roll across the floor depending on the depth of the carpet pile. Therefore, casters have significant disadvantages and are not practical in a residential setting.

Another solution has been the temporary use of sliders solely for the purpose of moving the furniture over a short distance by placing the slider under each of the legs of the article of furniture and then removing the slider once the article of furniture has been repositioned. These sliders are typically comprised of a body having a depression in an upper surface and also having a bottom surface that has a relatively low coefficient of friction with the floor surface. With a slider placed under each leg the article of furniture can be pushed with minimal force to its desired placement at which time the sliders are then removed. However, if during movement of the article of furniture a corner of the furniture is raised or encounters a small obstacle, the furniture leg can become dislodged from the slider and impact the floor surface resulting in scratches to the floor, possible tearing of carpet, or damage to the furniture leg.

Therefore, a furniture slider is needed that can be temporarily secured to the leg of an article of furniture for the purpose of moving the article of furniture over a floor surface wherein the furniture slider will not become dislodged if the leg is raised or if the furniture slider encounters an obstacle on the floor.

SUMMARY OF THE INVENTION

The present disclosure is generally directed to a furniture slide assembly that is selectively attachable to a leg of an article of furniture. The furniture slide assembly includes a slide body having a top for supporting the furniture leg and also having a bottom surface with a substantially low coefficient of friction. A clamp assembly is affixed to and supported above the slide body assembly and includes a clamp body formed of a resilient material. The body has a first arm and an opposing second arm wherein the body, the first arm, and the second arm have an inner surface which defines a receiving aperture in the clamp body and further defines an opening therebetween. A clamp arm extends from a distal end of the first arm and is securable to the second arm.

In another aspect, the slide body includes a plurality of substantially rigid rods extending vertically from a top periphery thereof and further wherein the clamp assembly supported by the rods.

In still another aspect, the top of the slide body defines a central depression therein for receiving the furniture leg.

In yet another aspect, the clamp assembly is vertically adjustable along the length of the substantially rigid rods.

In a still further aspect, the clamp body defines a plurality of support rod apertures, each support rod aperture closely receiving therein one of the substantially rigid rods.

In another aspect, the second arm of the clamp body includes a plurality of lugs extending laterally therefrom and further wherein the clamp arm defines an arm aperture sized to receive at least one of the lugs therein.

In another aspect, the inner surface defining the receiving aperture includes a plurality of resilient ridges extending inwardly into said receiving aperture.

In a still further aspect, the furniture slide assembly further comprises a securement assembly affixed to the clamp body and includes a length of loop segment of a hook and loop fastener extendable about a periphery of the clamp body in a first direction and a length of hook segment of a hook and loop fastener extendable about a periphery of the clamp body in a second opposing direction.

In a further aspect, the securement assembly is affixed to the clamp body opposite from the opening defined between the ends of the first arm and the second arm.

In yet another aspect, the securement assembly further includes a lanyard having a spacer affixed to an end thereof wherein the lanyard is of a length to permit insertion of the spacer in the receiving aperture.

In another aspect, the spacer is a tubular segment formed of a moldable resin.

In still another aspect, a furniture slide assembly which is selectively attachable to a leg of an article of furniture comprises a slide body assembly including a slide body having a top for supporting the furniture leg and a bottom surface having a substantially low coefficient of friction. A plurality of substantially rigid rods extends vertically from the top periphery of the slide body. A clamp assembly is affixed to and supported by the rods above the slide body assembly and includes a clamp body formed of a resilient material and has a first arm and an opposing second arm. The clamp body, the first arm and the second arm have an inner surface defining a receiving aperture in the clamp body and further define an opening therebetween. The clamp body also defines a plurality of support rod apertures, each support rod aperture closely receiving therein one of the substantially rigid rods. A clamp arm extends from a distal end of the first arm and is securable to the second arm. A securement assembly is affixed to the clamp body and includes a length of loop segment of a hook and loop fastener extendable about a periphery of the clamp body and a first direction and a length of hook segment of a hook and loop fastener extendable about a periphery of the clamp body in a second opposing direction.

In yet another aspect, the top of the slide body defines a central depression therein for receiving the furniture leg.

In another aspect, the top is covered with a non-skid layer.

In still another aspect, the clamp assembly is vertically adjustable along a length of the substantially rigid rods.

In yet another aspect, the second arm of the clamp body includes a plurality of lugs extending laterally therefrom, and the clamp arm defines an arm aperture sized to receive at least one of the lugs therein.

In a still further aspect, the inner surface defining the receiving aperture includes a plurality of resilient ridges extending inwardly into the receiving aperture.

In another aspect, the securement assembly is affixed to the clamp body opposite from the opening defined between the ends of the first arm and the second arm.

In another aspect, the securement assembly also includes a lanyard having a spacer affixed to an end thereof wherein the lanyard is of a length to permit insertion of the spacer in the receiving aperture.

In a still further aspect, the spacer is a tubular segment formed of a moldable resin.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

In one exemplary implementation of the invention, a furniture slide assembly 100 is shown in FIGS. 1-7 illustrating its various components where a slide body assembly 110 supports thereabove a clamp assembly 130 for securing the leg of an article of furniture to the furniture slide assembly 100.

Figure 2:
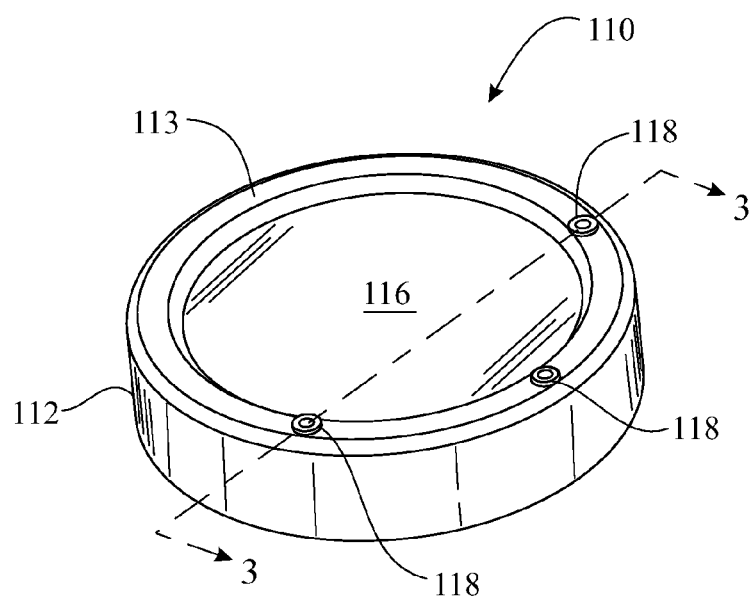
FIG. 2 presents a top isometric view of the slide body assembly
Figure 3:
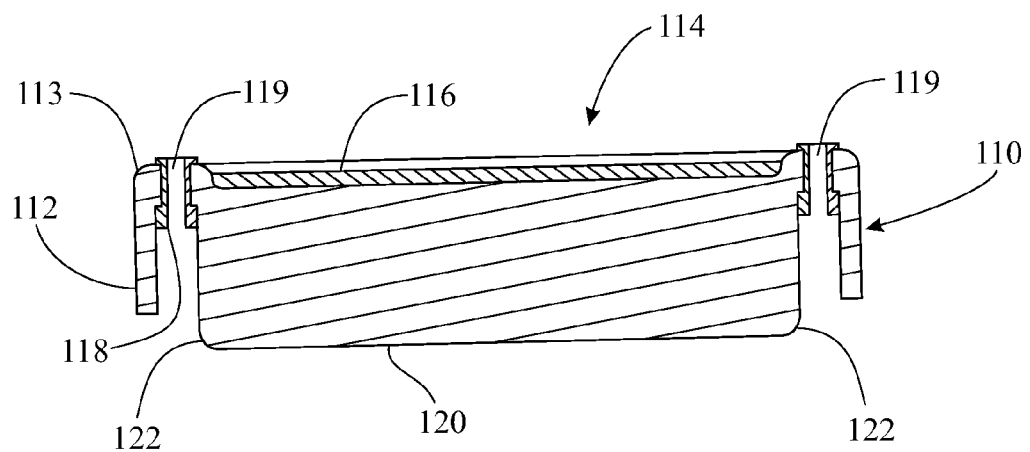
FIG. 3 presents a cross-sectional view of the slide body assembly shown in FIG. two and taken along the line 3-3, FIG. 2.

As illustrated in FIGS. 2-3, the slide body assembly 110 comprises a slide body 112 which is typically fabricated of a moldable resin wherein the resin exhibits a low coefficient of friction with respect to a floor surface such as carpeting. However, the slide body 112 is also alternatively contemplated to be molded of other materials wherein a layer of low coefficient of friction material is applied to the bottom surface 120 (not shown). In a most preferred configuration, the slide body 112 is formed as a circular disk wherein the periphery of the bottom exhibits a radiused edge 122 to facilitate easy movement across the floor surface. The top of the slide body 112 includes a raised rim 113 which defines a central depression 114 in the central portion of the slide body 112 is for receiving the bottom of the leg of the article of furniture to be moved. In the illustrated configuration of the slide body 112, the central depression 114 includes a non-skid layer 116 to facilitate the immobilization of the furniture leg resting thereon.

Figure 1:
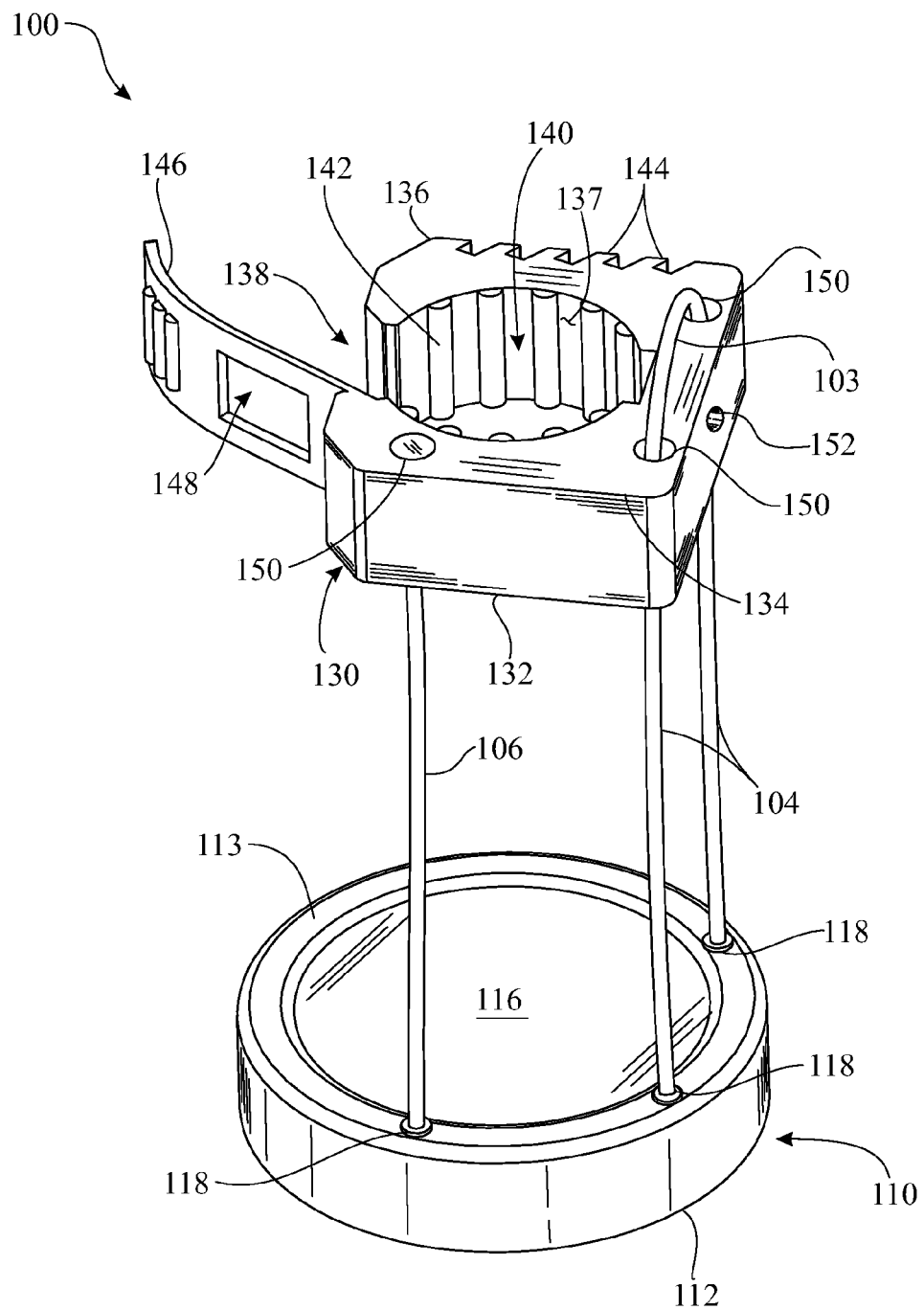
FIG. 1 presents a perspective view of a furniture slide assembly embodying the present invention, wherein it leg clamp is supported above the slide body.

A plurality of support inserts 118 are internally retained about the periphery of the slide body 112, and most preferably in the rim 113. The support inserts 118 are preferably fabricated from a resilient material to facilitate a frictional retention within the rim area 113 of the slide body 112. Each of the support inserts 118 defines an aperture 119, wherein each aperture 119 closely receives a support rod 104, 106 (FIG. 1). The support rods can be linear such as the support rod 106 or can be formed as an inverted "U" 103 with each rod leg 104 engaging a support insert 118.

Figure 4:
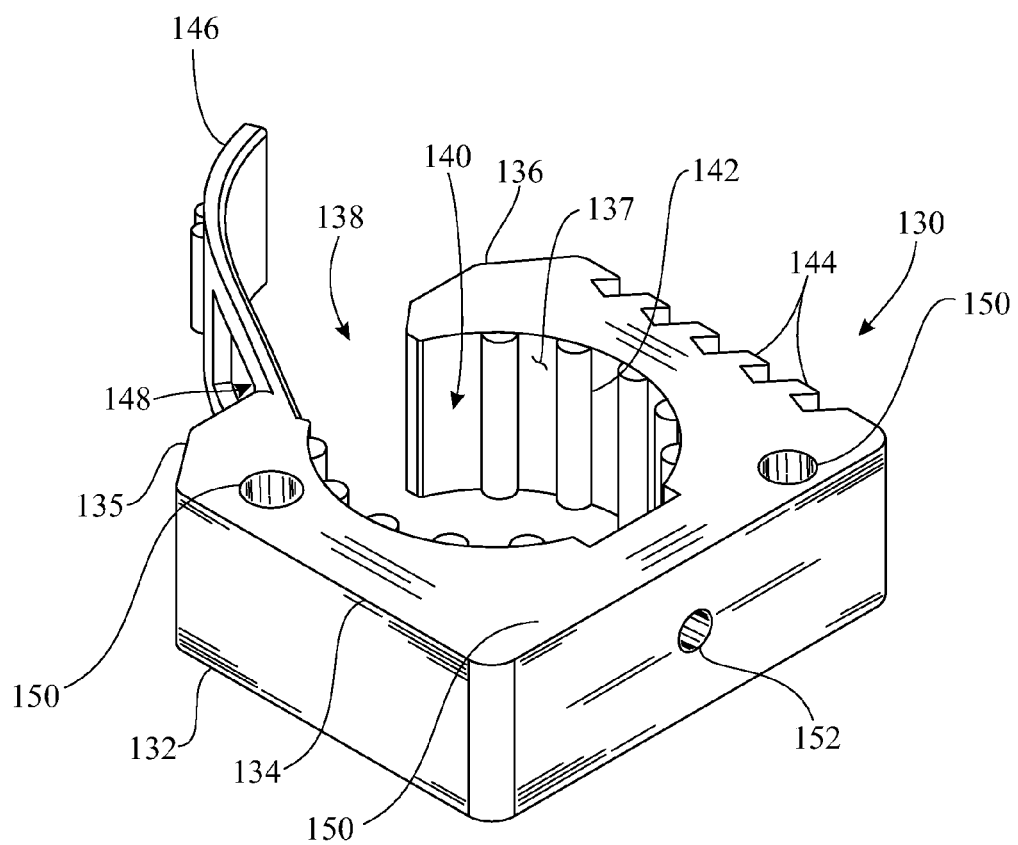
FIG. 4 presents a partially exploded top isometric view of the clamp assembly.

As best shown in FIG. 4, the clamp assembly 130 includes a clamp body 132 preferably molded of a resilient material such as rubber or other similar material. The clamp body 132 includes a first arm 134 and an opposing second arm 136 which in combination with the body 132 have an internal surface 137 defining a receiving aperture 140 therein. The internal surface 137 defining the receiving aperture 140 can also include a plurality of resilient ridges 142 extending away from the internal surface 137 into the receiving aperture 140. The resilient ridges 142 can aid in gripping a furniture leg received in the receiving aperture 140. The distal ends 135, 137 of the first and second arms 134, 136 respectively define an opening 138 through which the leg of an article of furniture can be laterally translated and be received in the receiving aperture 140.

The second arm 136 includes, on an exterior surface thereof, a plurality of spaced apart lugs 144 extending laterally outwardly therefrom. The first arm 134, has at a distal end 135 thereof, a clamp arm 146 affixed thereto. Clamp arm 146 further defines an arm aperture 148 which is sized to receive at least one of the lugs 144 extending from second arm 136.

When a leg of an article of furniture is received in receiving aperture 140, the resilient arms 134, 136 can be flexed to securely engage the furniture leg, and the clamp arm 146 can be translated to engage one of the lugs 144 within the arm aperture 148 to secure the clamp assembly about the furniture leg.

The clamp body 132 also defines a plurality of support rod apertures 150 extending therethrough and substantially corresponding in placement with and each receiving therethrough, one of the support rods 104, 106. When an inverted "U" 103 is utilized, the support legs 104 are received in adjacent support rod apertures 150 and the apex of the "U" functions as a stop to limit the uppermost vertical adjustment of the clamp assembly 130.

Figure 5:
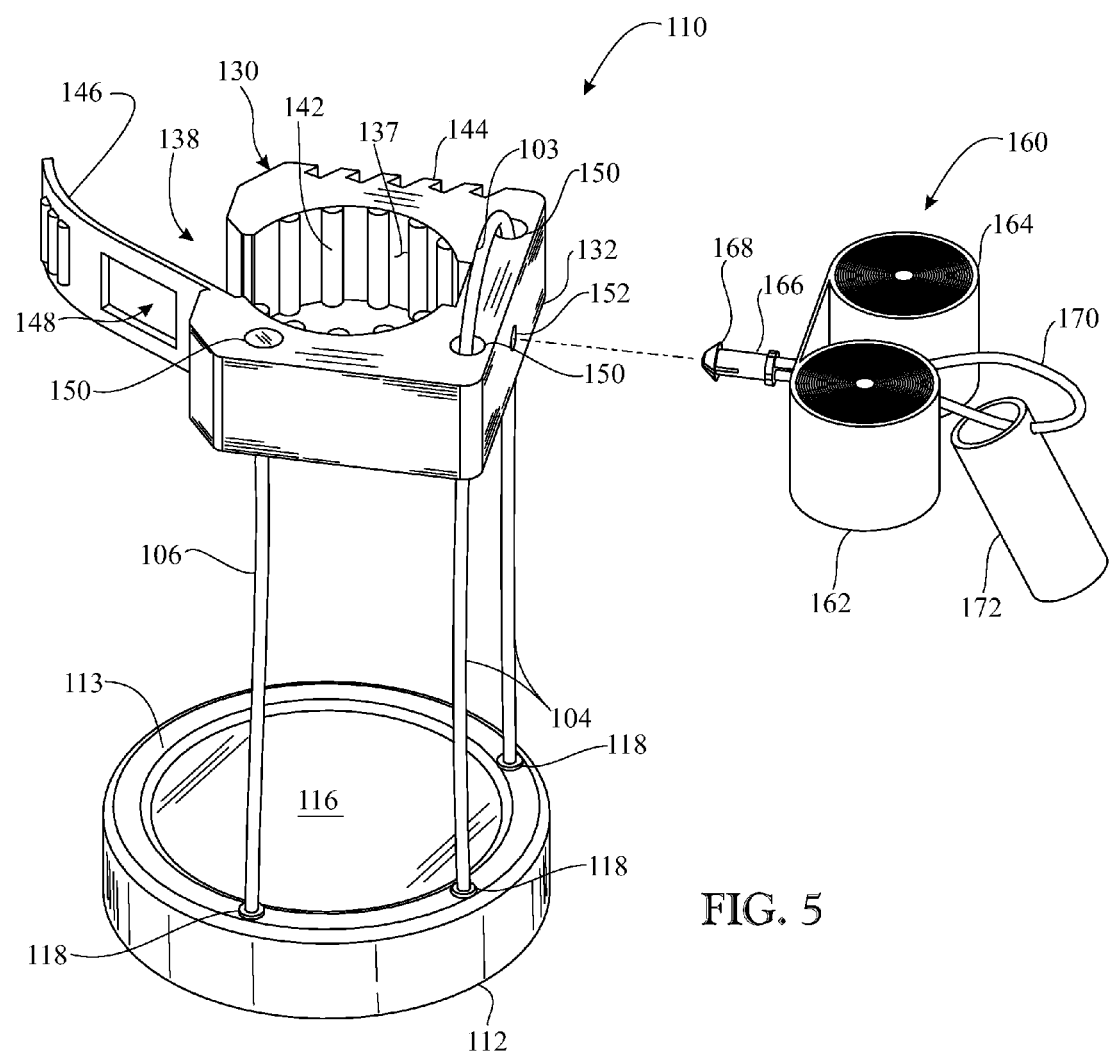
FIG. 5 presents a top isometric view of the furniture slide assembly showing the addition of a securement assembly.
Figure 6:
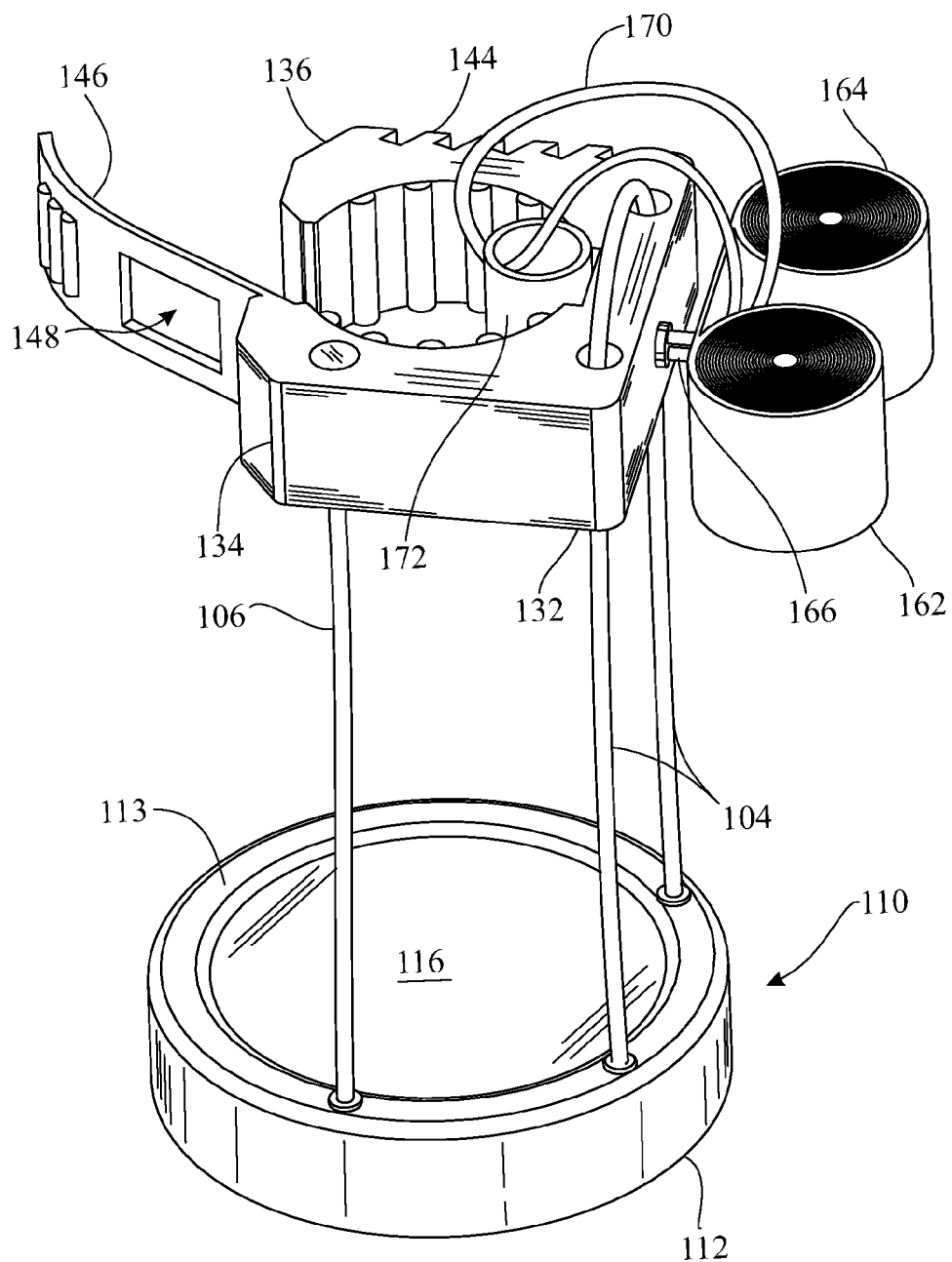
FIG. 6 presents a top isometric view of the furniture slide assembly illustrating the placement of a tubular spacer in the receiving aperture of the clamp assembly.
Figure 7:
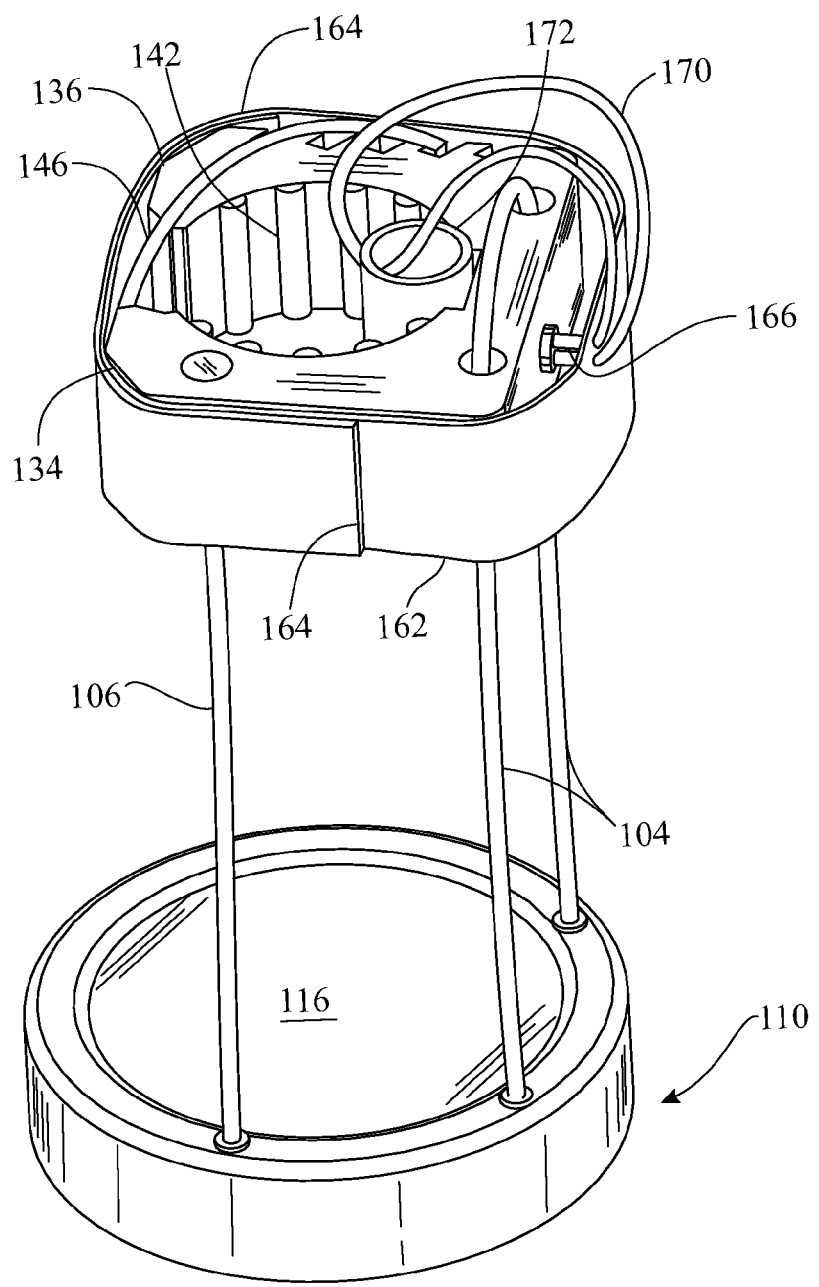
FIG. 7 presents a top isometric view of the furniture slide assembly wherein the hook and loop fastener is secured about the clamp assembly.

As illustrated in FIGS. 5-7, clamp body 132 can also define an aperture 152 therein which is most preferably positioned opposite from opening 138. A securement assembly 160 includes a pin 166 having a locking head 168 which is inserted into aperture 152 to secure the securement assembly 160 to the clamp assembly 130. Securement assembly 160 includes a hook segment 162 of a hook and loop fastener wherein the loop segment 162 is positioned to extend about a periphery of the clamp assembly 130 in a first direction. The securement assembly 160 further includes a hook segment 164 of a hook and loop fastener and is positioned to extend about a periphery of the clamp assembly 130 in a second opposing direction. In this manner, once the leg of an article of furniture is received in the clamp assembly 130 and the clamp arm 146 has engaged one of the lugs 144, the hook and loop segments 164, 162 respectively can be extended about the periphery of the clamp 130 in opposing directions and engaged one with the other to prevent the accidental disengagement of the clamp arm 146 from the engaged lug 144 during movement of the article of furniture.

The securement assembly 160 further includes a spacer 172 and a lanyard 170 to which the spacer 172 is affixed and of sufficient length to permit the insertion of the spacer 172 in the receiving aperture 140 of the clamp assembly 130. In a most preferable embodiment, the spacer is a tubular segment of molded resin. In use, when the leg of an article of furniture is of a size smaller than the receiving aperture 140 the spacer 172 may be inserted into the receiving aperture 140 to permit the interior surface 137 and the ridges 142 to be clamped in engaging contact with the furniture leg.

In use, a plurality of furniture slide assemblies 100 are arranged such that one slide assembly 100 is positioned with each leg of an article of furniture to be moved. The clamp assembly 130 is vertically adjusted along the length of support rods 104, 106 such that the clamp assembly is of a proper height to engage the furniture leg. The leg of the article of furniture is raised slightly, and the slide assembly 100 is translated such that the slide body 112 is under the furniture leg and that the furniture leg rests upon the non-skid surface 116. The leg is inserted through the opening 138 of the clamp assembly 130 until it is fully received in the receiving aperture 140. The first and second arms 134, 136 of the clamp assembly 130 are urged one toward the other so that the furniture leg is firmly grasped by the interior surface 137 and the ridges 142 defining the receiving aperture 140. The clamp arm 146 is then positioned to engage at least one of the lugs 144 extending laterally from the second arm 136 in the arm aperture 148 of the clamp arm 146. Then, if desired, the loop segment 162 of the hook and loop fastener of the securement assembly 160 is extended about the periphery of the clamp assembly 130 in a first direction, and the hook segment 164 is extended about the clamp assembly periphery in an opposite direction for engagement with the loop segment 162 thereby securing the clamp assembly 130 about the leg of the furniture article. If the leg of the furniture article is too small to be securely grasped by the clamp assembly 130 the spacer 172 of the securement assembly 160 can be placed in the receiving aperture 140 abutting the furniture leg to act as a filler to permit secure grasping of the furniture leg by the clamp assembly 130. The procedure is repeated for each leg of the article of furniture whereupon the article of furniture can then be translated over the floor surface as a result of the minimal friction of the bottom surface of the slide body 112. Once the furniture article has been placed, the slide assemblies 100 can be removed from each furniture leg by reversing the above procedure.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What I claim is:

1. A furniture slide assembly selectively attachable to a leg of an article of furniture, said furniture slide assembly comprising:
   a slide body includes a top for supporting the furniture leg and has a bottom surface having a substantially low coefficient of friction;
   a clamp assembly affixed to and supported above said slide body assembly, said clamp assembly including:
      a clamp body formed of a resilient material and having a first arm and an opposing second arm, said body, said first arm, and said second arm having an inner surface defining a receiving aperture in said clamp body and further defining an opening therebetween; and
      a clamp arm extending from a distal end of said first arm and securable to said second arm; and
   at least one rod extending between, and attaching together, said clamp and said slide body.

2. The furniture slide assembly according to claim 1, wherein said at least one rod further comprises a plurality of rods extending between, and attaching together, said clamp and said slide body.

3. The furniture slide assembly according to claim 2 wherein said top of said slide body defines a central depression therein for receiving the furniture leg.

4. The furniture slide assembly according to claim 2 wherein said clamp assembly is vertically adjustable along a length of said plurality of rods.

5. The furniture slide assembly according to claim 4 wherein said clamp body defines a plurality of support rod apertures, each support rod aperture closely receiving therein one of said plurality of rods.

6. The furniture slide assembly according to claim 1 wherein said second arm of said clamp body includes a plurality of lugs extending laterally therefrom and further wherein said clamp arm defines an arm aperture sized to receive at least one of said lugs therein.

7. The furniture slide assembly according to claim 1 wherein said inner surface defining said receiving aperture includes a plurality of resilient ridges extending inwardly into said receiving aperture.

8. A furniture slide assembly selectively attachable to a leg of an article of furniture, said furniture slide assembly comprising:
   a slide body includes a top for supporting the furniture leg and has a bottom surface having a substantially low coefficient of friction;

a clamp assembly affixed to and supported above said slide body assembly, said clamp assembly including:
    a clamp body formed of a resilient material and having a first arm and an opposing second arm, said body, said first arm, and said second arm having an inner surface defining a receiving aperture in said clamp body and further defining an opening therebetween; and
    a clamp arm extending from a distal end of said first arm and securable to said second arm; and
a securement assembly affixed to said clamp body, said securement assembly including:
    a length of loop segment of a hook and loop fastener extendable about a periphery of said clamp body in a first direction; and
    a length of hook segment of a hook and loop fastener extendable about a periphery of said clamp body in a second opposing direction.

9. The furniture slide assembly according to claim 8 wherein said securement assembly is affixed to said clamp body opposite from said opening defined between the ends of said first arm and said second arm.

10. The furniture slide assembly according to claim 8 wherein said securement assembly further includes a lanyard having a spacer affixed to an end thereof, said lanyard of a length to permit insertion of said spacer in said receiving aperture.

11. The furniture slide assembly according to claim 10 wherein said spacer is a tubular segment formed of a moldable resin.

12. A furniture slide assembly selectively attachable to a leg of an article of furniture, said furniture slide assembly comprising:
a slide body assembly including:
    a slide body having a top for supporting the furniture leg and a bottom surface having a substantially low coefficient of friction; and
    a plurality of substantially rigid rods extending vertically from a top periphery thereof;
a clamp assembly affixed to and supported by said rods above said slide body assembly, said clamp assembly including:
    a clamp body formed of a resilient material and having a first arm and an opposing second arm, said body, said first arm, and said second arm having an inner surface defining a receiving aperture in said clamp body and further defining an opening therebetween, said clamp body defines a plurality of support rod apertures, each support rod aperture closely receiving therein one of said substantially rigid rods; and
    a clamp arm extending from a distal end of said first arm and securable to said second arm; and
a securement assembly affixed to said clamp body, said securement assembly including:
    a length of loop segment of a hook and loop fastener extendable about a periphery of said clamp body in a first direction; and
    a length of hook segment of a hook and loop fastener extendable about a periphery of said clamp body in a second opposing direction.

13. The furniture slide assembly according to claim 12 wherein said top of said slide body defines a central depression therein for receiving the furniture leg.

14. The furniture slide assembly according to claim 12 wherein said top is covered with a non-skid layer.

15. The furniture slide assembly according to claim 12 wherein said clamp assembly is vertically adjustable along a length of said substantially rigid rods.

16. The furniture slide assembly according to claim 12 wherein said second arm of said clamp body includes a plurality of lugs extending laterally therefrom and further wherein said clamp arm defines an arm aperture sized to receive at least one of said lugs therein.

17. The furniture slide assembly according to claim 12 wherein said inner surface defining said receiving aperture includes a plurality of resilient ridges extending inwardly into said receiving aperture.

18. The furniture slide assembly according to claim 12 wherein said securement assembly is affixed to said clamp body opposite from said opening defined between the ends of said first arm and said second arm.

19. The furniture slide assembly according to claim 12 wherein said securement assembly further includes a lanyard having a spacer affixed to an end thereof, said lanyard of a length to permit insertion of said spacer in said receiving aperture.

20. The furniture slide assembly according to claim 19 wherein said spacer is a tubular segment formed of a moldable resin.

* * * * *